Patented Aug. 3, 1948

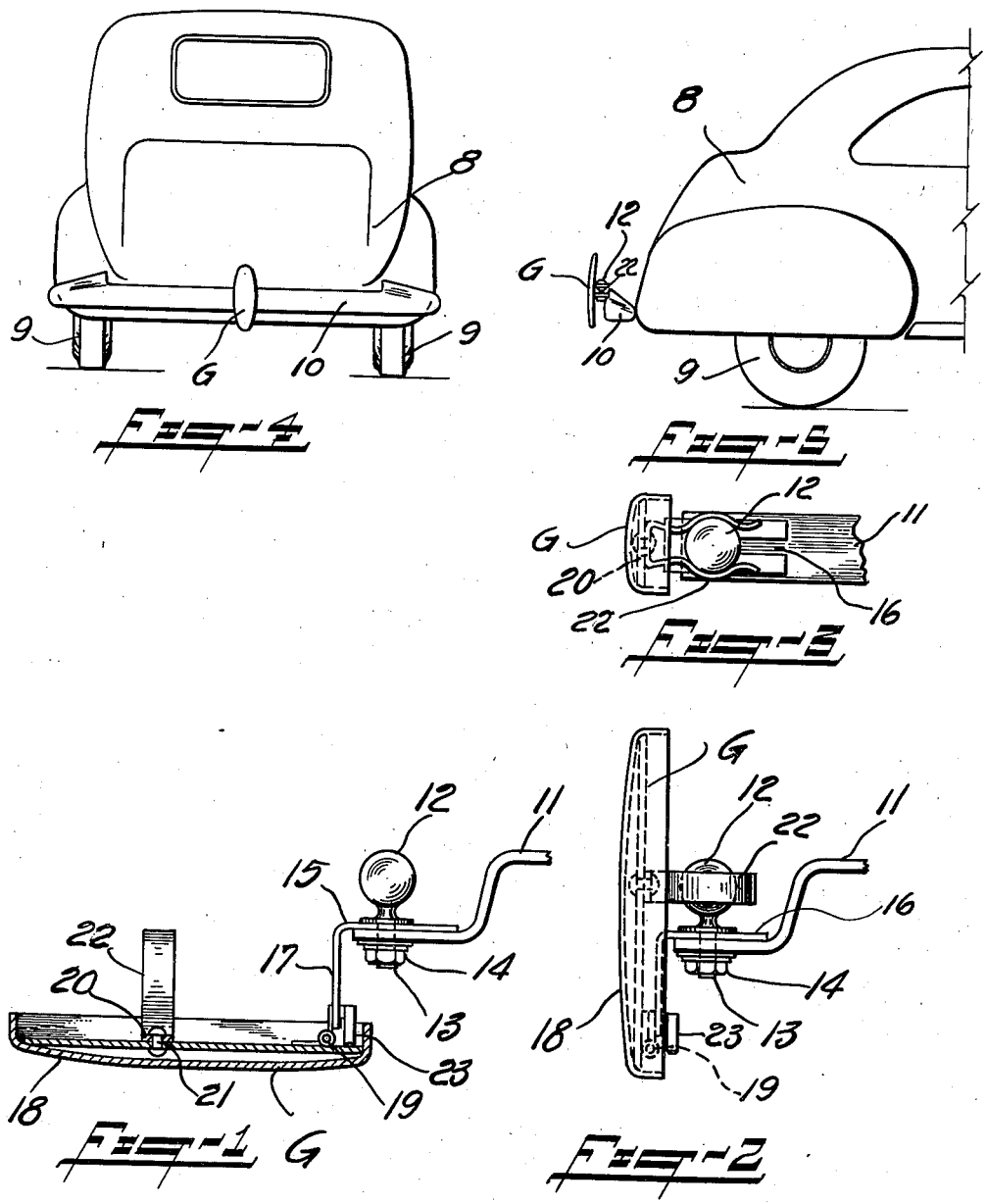

2,446,347

UNITED STATES PATENT OFFICE 2,446,347

TRAILER BALL BOLT GUARD

Edward L. Walkowiak, Saginaw, Mich.

Application March 8, 1946, Serial No. 653,080

2 Claims. (Cl. 280—33.44)

This invention relates to guards for shielding the ball bolt of a trailer bolt when it is mounted in position on an automobile.

One of the prime objects of the invention is to design a ball bolt guard which serves to overlie and shield said bolt to prevent the bumpers, etc., of other vehicles from snagging, riding over, and becoming hooked over said ball bolt, as frequently occurs when vehicles must be parked in parallel relation in highly congested areas.

When vehicles become hooked together it necessitates lifting the front bumpers of the one vehicle, or depressing the bumper of the vehicle on which the ball bolt is mounted to disengage the bumper and simultaneously push the vehicles apart.

The disengaging operation above referred to is quite difficult, ofttimes it is necessary to use jacks to raise one vehicle sufficiently to effect disengagement, usually, however, one person steps on the one bumper to depress it, while another one or more persons attempt to raise the forward end of the other vehicle; this soils the hands and clothing, and there is also the further hazard of possible strained backs and the possibility of fingers and feet becoming jammed between the bumpers as they are disengaged.

Another object is to design an adjustable ball bolt shield which can be readily swung down to permit the attachment of a hitch in the conventional manner, and which can also be swung up to form a guard for the ball bolt after the hitch has been uncoupled.

A further object is to design a guard of neat and pleasing design, which harmonizes with the car bumper and which readily and automatically locks in raised position.

With the above and other objects in view, the present invention consists in the combination and arrangement of parts, hereinafter more fully described, illustrated in the accompanying drawing, and more particularly pointed out in the appended claims, it being understood that changes may be made in the size, form, proportion and minor details of construction, without departing from the spirit, or sacrificing any of the advantages of the invention.

In the drawing:

Fig. 1 is a sectional-elevational, edge view of the guard showing it in position on the vehicle and swung down to permit a conventional hitch to be coupled to a ball bolt.

Fig. 2 is also an edge-elevational view showing the guard swung up and detachably clamped to the ball bolt to form a guard.

Fig. 3 is a fragmentary, top, plan view.

Fig. 4 is a rear-elevational view of an automobile with the guard in position thereon.

Fig. 5 is a fragmentary, side-elevational view of an automobile with a ball bolt and guard mounted thereon.

Referring now more specifically to the drawing in which I have shown the preferred embodiment of my invention, the numeral 8 indicates the body of a conventional automobile, which is mounted on wheels 9 as usual, and a rear bumper 10 is provided on the vehicle in the conventional manner.

A draft bar 11 is attached to the vehicle frame (not shown) in any desired manner, and a conventional ball bolt 12 is mounted on said strap, the lower threaded end 13 of said bolt extending through a suitable opening in the draft bar 11, and a nut 14 serves to secure it firmly in position, this ball bolt and the manner of mounting being of conventional style and arrangement.

The guard G is designed to harmonize with the bumper 10 of the vehicle, and includes a strap 15, bifurcated as at 16 to accommodate the bolt section 12 of the ball bolt, this strap being downwardly bent as at 17, the lower end being hingedly connected to the guard section 18 at the point 19, this section being of sufficient height so that when in raised position, it overlies and extends a predetermined distance above the ball bolt proper.

A resilient U-shaped clasp 20 is secured to the guard G by means of a bolt or rivet 21, the legs 22 of the clasp being resilient and are shaped to embrace the rounded section of the ball bolt 12 and hold the guard firmly in raised position.

With the guard in position as shown in Figs. 2, 3, 4 and 5 of the drawing, the section 18 forms a shield which is of sufficient height to prevent the bumpers of other cars from sliding over the ball bolt and thus hooking the cars together, making it necessary to raise the front end of the one car over the bolt, and rocking the cars apart to become disengaged, and it will be readily apparent that this unhooking cannot be accomplished by lady drivers.

The guard is easy to operate, it is of simple construction and can be easily and quickly attached, it harmonizes with the vehicle bumper and practically conceals the ball bolt from view, yet it can be readily swung down to permit attachment of the coupling, a stop 23 being provided on the lower end of the section 17 and engages the hinge 19 to limit the downward swing of the guard.

From the foregoing description, it will be obvious that I have perfected a very simple, practical and inexpensive ball bolt guard for shielding the ball bolts on vehicles of any nature.

What I claim is:

1. A combination with a ball bolt, of an L-shaped bifurcated strap member, the bifurcated end being engaged by the ball bolt structure for clamping it rigidly in position, a guard associated with the ball bolt and hingedly connected to the lower end of the strap, and adapted in one position to form a shield that overlies and extends a distance above and below said ball bolt, and in another position to permit unobstructed access to said ball bolt to permit attachment of a hitch coupling thereto, and resilient U-shaped clasps secured to said guard at a point intermediate its length for resiliently embracing said ball bolt to releasably secure the guard in upright position.

2. The combination defined in claim 1 in which a stop is provided for limiting the downward swing of said guard.

EDWARD L. WALKOWIAK.

REFERENCES CITED

The following references are of record in the file of this patent:

UNITED STATES PATENTS

| Number | Name | Date |
| --- | --- | --- |
| 2,092,156 | Harper | Sept. 7, 1937 |
| 2,342,907 | Stall | Feb. 29, 1944 |